US009690060B2

(12) United States Patent
Dai et al.

(10) Patent No.: US 9,690,060 B2
(45) Date of Patent: Jun. 27, 2017

(54) OPTICAL FIBER CONNECTOR AND OPTICAL COUPLING LENS

(71) Applicant: HON HAI PRECISION INDUSTRY CO., LTD., New Taipei (TW)

(72) Inventors: Feng-Yuen Dai, New Taipei (TW); Jih-Chen Liu, New Taipei (TW); Hung-Lien Yeh, New Taipei (TW); Chen-Han Lin, New Taipei (TW); Po-Wei Huang, New Taipei (TW); Yung-Chang Tseng, New Taipei (TW); Ying-Jhih Hong, New Taipei (TW); Yi Hung, New Taipei (TW); Chang-Wei Kuo, New Taipei (TW); I-Thun Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/926,637

(22) Filed: Oct. 29, 2015

(65) Prior Publication Data

US 2016/0187586 A1 Jun. 30, 2016

(30) Foreign Application Priority Data

Dec. 29, 2014 (TW) .............................. 103146152 A

(51) Int. Cl.
*G02B 6/32* (2006.01)
*G02B 6/42* (2006.01)

(52) U.S. Cl.
CPC ........... *G02B 6/428* (2013.01); *G02B 6/4206* (2013.01); *G02B 6/4214* (2013.01); *G02B 6/4257* (2013.01); *G02B 6/4292* (2013.01)

(58) Field of Classification Search
CPC ............... G02B 6/32; G02B 6/43; G02B 6/42
USPC ........................................................... 385/14
See application file for complete search history.

(56) References Cited

U.S. PATENT DOCUMENTS

| | | | | |
|---|---|---|---|---|
| 6,002,459 | A * | 12/1999 | Kaise et al. | 349/95 |
| 6,433,942 | B1 * | 8/2002 | Memezawa et al. | 359/833 |
| 6,536,957 | B1 * | 3/2003 | Buchter | 385/89 |
| 6,739,760 | B2 * | 5/2004 | Cheng et al. | 385/89 |
| 6,784,409 | B2 * | 8/2004 | Kitani | 250/208.1 |
| 7,671,992 | B2 * | 3/2010 | Ehbets et al. | 356/416 |
| 7,781,781 | B2 * | 8/2010 | Adkisson et al. | 257/84 |
| 7,880,252 | B2 * | 2/2011 | Funao | 257/432 |
| 8,076,172 | B2 * | 12/2011 | Akiyama | 438/70 |
| 8,532,449 | B2 * | 9/2013 | Mohammed et al. | 385/33 |

(Continued)

*Primary Examiner* — Kaveh C Kianni
(74) *Attorney, Agent, or Firm* — Steven Reiss

(57) ABSTRACT

An optical coupling lens includes main section, beam splitting section, first lens, second lens and third lens. A first groove is formed in the main section. A second groove is formed in the first groove. The beam splitting section includes a first total reflecting surface and a second total reflecting surface. A dihedral-angle between the first total reflecting surface and the second total reflecting surface is predetermined. The first lens is defined in the first groove. The first lens includes a beam splitter. The beam splitter includes a first light emitting surface. The first light emitting surface is connected to the first total reflecting surface. The second lens is defined in the second groove. The second lens is corresponding to the first lens. The third lens defined in the second groove. The third lens is corresponding to the second total reflecting surface.

11 Claims, 5 Drawing Sheets

(56) References Cited

U.S. PATENT DOCUMENTS

| | | |
|---|---|---|
| 8,777,497 B2* | 7/2014 | Kim et al. .................. 385/93 |
| 8,979,392 B2* | 3/2015 | Lin ............................ 385/93 |
| 2001/0048064 A1* | 12/2001 | Kitani ..................... 250/208.1 |
| 2003/0025825 A1* | 2/2003 | Nakajoh ................... 348/374 |
| 2003/0152336 A1* | 8/2003 | Gurevich et al. ............ 385/88 |
| 2004/0012698 A1* | 1/2004 | Suda et al. ................ 348/315 |
| 2005/0122465 A1* | 6/2005 | Togashi .................... 349/190 |
| 2007/0145425 A1* | 6/2007 | Woo ......................... 257/233 |
| 2008/0116537 A1* | 5/2008 | Adkisson et al. ........... 257/448 |
| 2008/0218461 A1* | 9/2008 | Sugita et al. ............... 345/88 |
| 2008/0251874 A1* | 10/2008 | Ishibe ....................... 257/432 |
| 2008/0278664 A1* | 11/2008 | Okayama .................. 349/95 |
| 2009/0039454 A1* | 2/2009 | Masuda et al. ............. 257/432 |
| 2009/0079019 A1* | 3/2009 | Funao ........................ 257/432 |
| 2009/0091760 A1* | 4/2009 | Ehbets et al. .............. 356/419 |
| 2009/0174018 A1* | 7/2009 | Dungan et al. ............. 257/432 |
| 2009/0212381 A1* | 8/2009 | Crisp et al. ................. 257/432 |
| 2009/0283847 A1* | 11/2009 | Kawasaki et al. .......... 257/432 |
| 2009/0325337 A1* | 12/2009 | Cheng et al. ............... 438/70 |
| 2010/0033607 A1* | 2/2010 | Komatsu et al. ........... 348/273 |
| 2010/0053407 A1* | 3/2010 | Crisp et al. ................. 348/311 |
| 2010/0065897 A1* | 3/2010 | Jun ............................ 257/294 |
| 2010/0127157 A1* | 5/2010 | Tamaki et al. ........... 250/208.1 |
| 2010/0244175 A1* | 9/2010 | Park .......................... 257/459 |
| 2010/0264503 A1* | 10/2010 | Inoue et al. ................ 257/432 |
| 2011/0068424 A1* | 3/2011 | Gambino et al. ........... 257/432 |
| 2011/0097037 A1* | 4/2011 | Kuznia et al. .............. 385/33 |
| 2012/0263416 A1* | 10/2012 | Morioka ..................... 385/33 |
| 2013/0161495 A1* | 6/2013 | Lin ......................... 250/227.11 |
| 2014/0056564 A1* | 2/2014 | Lin ............................ 385/89 |
| 2014/0153881 A1* | 6/2014 | Liff et al. ................... 385/89 |

* cited by examiner

OPTICAL FIBER CONNECTOR AND OPTICAL COUPLING LENS

FIELD

The subject matter herein generally relates to optical communication technology, particularly to an optical fiber connector and an optical coupling lens.

BACKGROUND

An optical fiber connector includes a light emitter. Electric current of the light emitter can change according to various factors during use, and light intensity of the light emitter changes accordingly.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
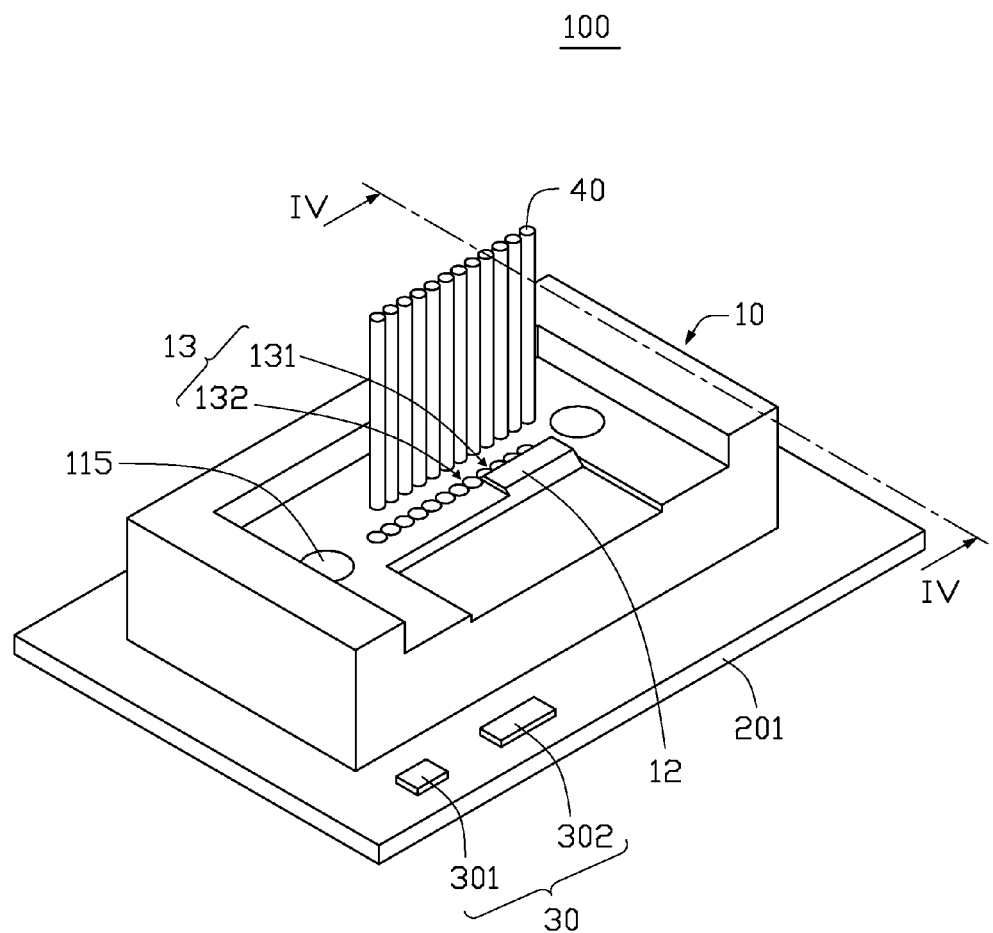
FIG. 1 is an isometric view of an optical fiber connector.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series, and the like.

The present disclosure is described in relation to an optical fiber connector and an optical coupling lens.

Figure 2:
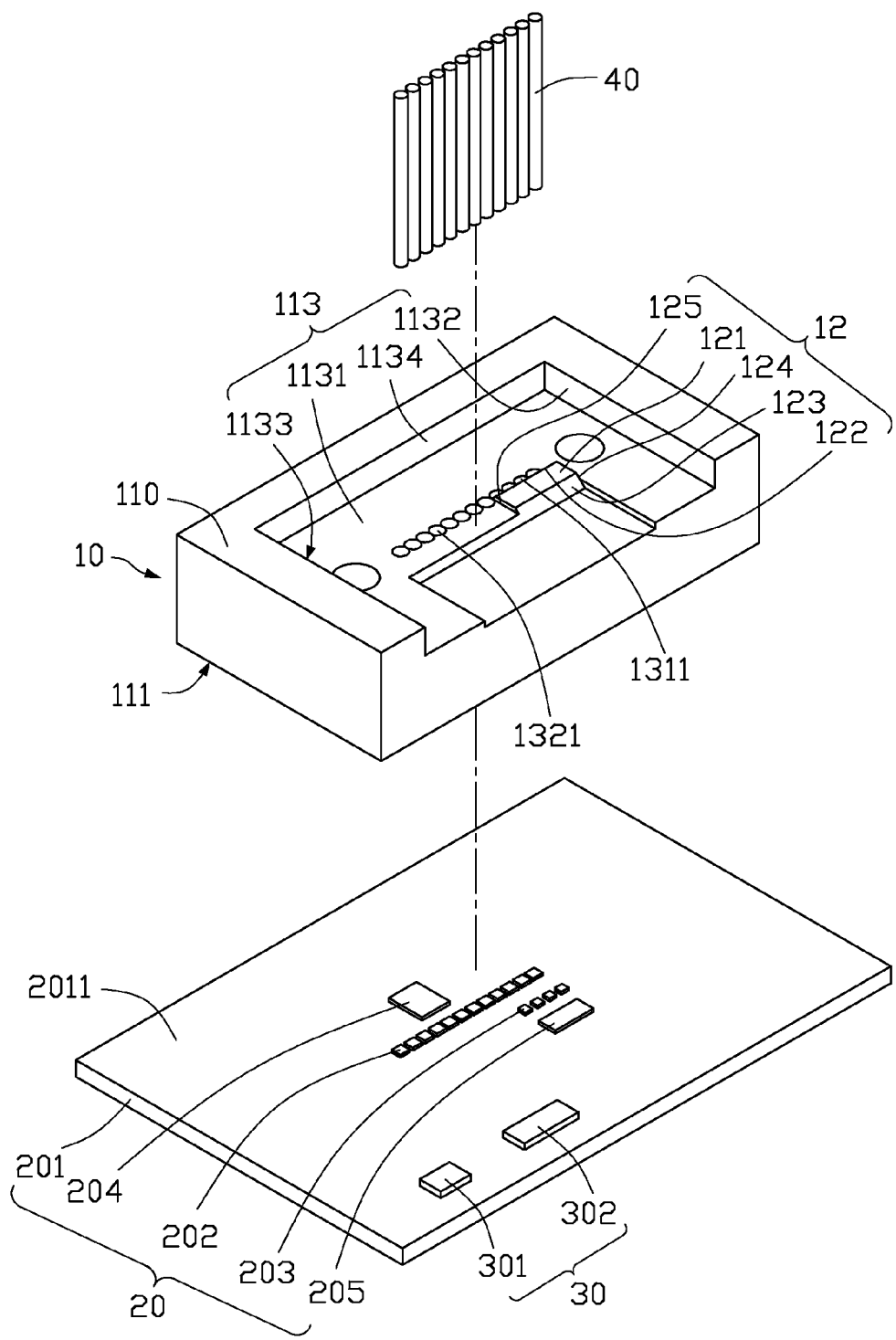
FIG. 2 is an exploded view of the optical fiber connector of FIG. 1.

FIG. 1 and FIG. 2 illustrate an optical fiber connector 100. The optical fiber connector 100 includes an optical coupling lens 10, a photoelectric conversion module 20, an energy monitoring module 30 and at least one optical fiber 40.

FIG. 2 illustrates that the photoelectric conversion module 20 includes a printed circuit board (PCB) 201, at least one light emitter 202, at least a photoelectric convertor 203, a driver chip 204, a transimpedance amplifier 205. The energy monitoring module 30 includes a filter 301 and an oscilloscope 302.

Figure 4:
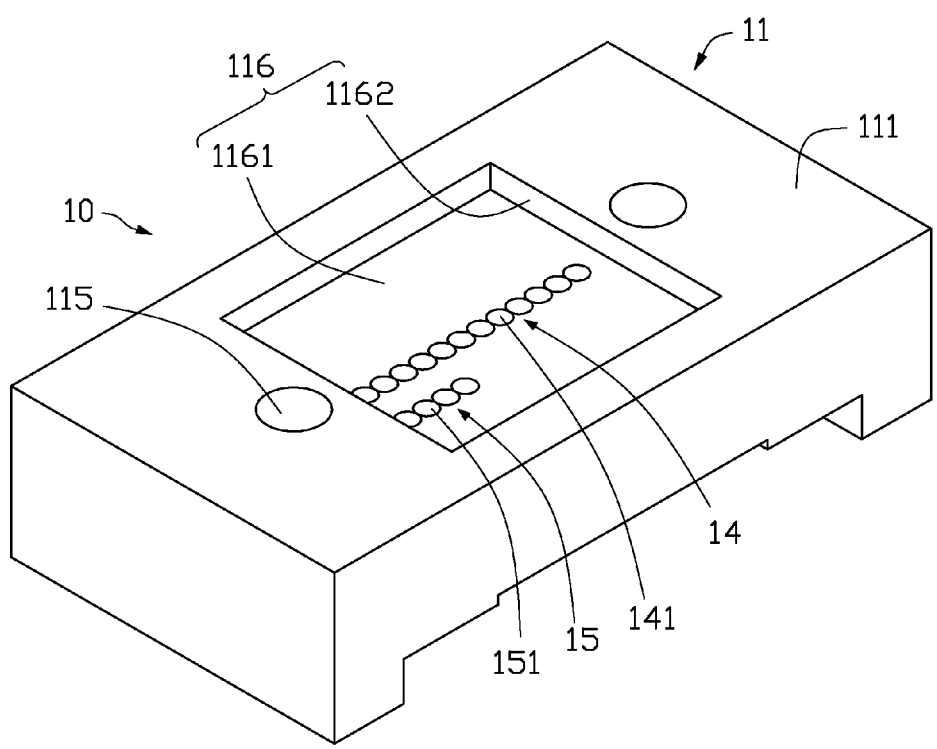
FIG. 4 is similar to FIG. 3, but viewed from another angle.

FIG. 2 and FIG. 4 illustrate that the optical coupling lens 10 includes a main section 11, a beam splitting section 12, a number of first lens 13, a number of second lens 14 and a number of third lens 15.

In the illustrated embodiment, the main section 11 is substantially cuboid-shaped. The main section 11 includes a first surface 110, a second surface 111 and a first side surface 112. The first surface 110 is opposite to the second surface 111 and is perpendicular to the first side surface 112. In the at least one embodiment, the main section 11 can be cube-shaped and other shapes.

A first groove 113 is recessed perpendicularly from the first surface 110 to the second surface 111. In the illustrated embodiment, the first groove 113 passes through the first side surface 112. The first groove 113 includes a third surface 1131, a second side surface 1132, a third side surface 1133 and a fourth side surface 1134. The third surface 1131 is parallel to the first surface 110. The second side surface 1132 is perpendicular to the third surface 1131. The third side surface 1133 is opposite to the second side surface 1132. The fourth side surface 1134 is perpendicular to the third surface 1131 and the second side surface 1132.

Figure 3:
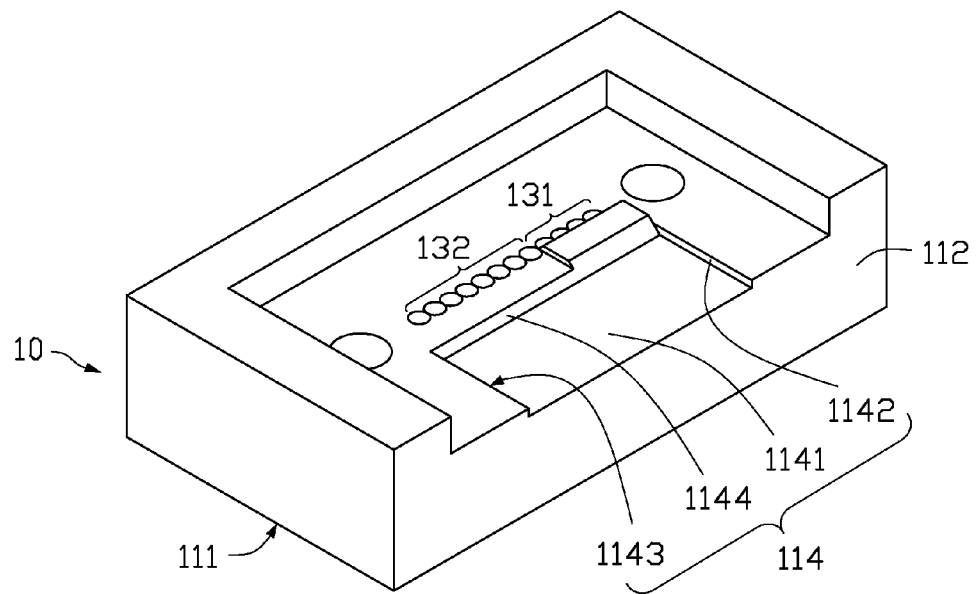
FIG. 3 is an isometric view of an optical coupling lens.

FIG. 2, FIG. 3 and FIG. 4 illustrate that a third groove 114 and two positioning through-holes 115 are formed on the third surface 1131. In the illustrated embodiment, the third groove 114 passes through the first side surface 112. The third groove 114 includes a fifth surface 1141, a fifth side surface 1142, a sixth side surface 1143 and a seventh side surface 1144. The fifth surface 1141 is parallel to the third surface 1131. The fifth side surface 1142 is perpendicular to the fifth surface 1141. The sixth side surface 1143 is opposite to the fifth side surface 1142. The seventh side surface 1144 is perpendicular to the fifth surface 1141 and the fifth side surface 1142. The fifth side surface 1142 is near to the second side surface 1132. A dihedral angle between the seventh side surface 1144 and the fifth surface 1141 is 45°. The first surface 110, the third surface 1131 and the fifth surface 1141 is substantially ladder-like.

In the illustrated embodiment, the two positioning through-holes 115 are adjacent to the second side surface 1132 and the third side surface 1133, respectively. The two positioning through-holes 115 pass through the third surface 1131 and the second surface 111. The two positioning through-holes 115 are configured to fix an optical fiber carrying device.

FIG. 4 illustrates that a second groove 116 is recessed perpendicularly from the second surface 111 to the first surface 110. The second groove 116 is between the two positioning through-holes 115. The second groove 116 includes a fourth surface 1161 and an eighth side surface 1162. The fourth surface 1161 is parallel to the second surface 111. The eighth side surface 1162 is perpendicular to the fourth surface 1161. The eighth side surface 1162 is adjacent to the second side surface 1132.

FIG. 2 illustrates that the beam splitting section 12 is formed on the third surface 1131. The beam splitting section 12 is near to the second side surface 1132. In the illustrated embodiment, the beam splitting section 12 is substantially stereo trapezoid-shaped and integrally formed with the main section 11.

The beam splitting section 12 includes a sixth surface 121, a first total reflecting surface 122, a second total reflecting surface 123, a ninth side surface 124 and a tenth side surface 125. The sixth surface 121 is parallel to the third surface 1131. A dihedral-angle between the first total reflecting surface 122 and the sixth surface 1161 is predetermined. Another dihedral-angle between the first total reflecting surface 122 and the second total reflecting surface 123 is also predetermined. The second total reflecting surface 123 is opposite to the first total reflecting surface 122. The ninth side surface 124 is intersecting with the first total reflecting surface 122, the second total reflecting surface 123 and the sixth surface 121. The tenth side surface 125 is opposite to the ninth side surface 124.

In the illustrated embodiment, the dihedral angle between the first total reflecting surface 122 and the sixth surface 121 is 45°. The dihedral angle between the first total reflecting surface 122 and the second total reflecting surface 123 is 90°. The second total reflecting surface 123 is coplanar with the seventh side surface 1144. The first total reflecting surface 122 and the second total reflecting surface 123 are configured to make the light emitting to the first total reflecting surface 122 refract 180°. The distance between the tenth side surface 125 and the second side surface 1132 is greater than the distance between the ninth side surface 125 and the second side surface 1132.

In the at least one embodiment, the beam splitting section 12 also can be other shapes, for example, pyramidal tetrahedron-shaped and so on.

FIG. 1 illustrates that the first lens 13 includes a number of beam splitters 131 and a number of convergent lenses 132. The convergent lenses 132 are collinear to the beam splitters 131.

In the illustrated embodiment, the amount of the beam splitters 131 is four. The amount of the convergent lenses 132 is eight. Every beam splitter 131 includes a first light emitting surface 1311. The first light emitting surface 1311 is an asymmetric surface and is a part of an optical surface of a complete symmetrical lens. The first light emitting surface 1311 is connected to the first total reflecting surface 122. Every convergent lens 132 includes a second light emitting surface 1321. The first light emitting surfaces 1311 and the second light emitting surfaces 1321 face the optical fibers 90 one to one. The beam splitters 131 and the convergent lenses 132 are configured to focus the parallel light and then transmit the focused beam to the optical fiber 40.

FIG. 4 illustrates that the second lenses 14 are defined on the fourth surface 1161 and set in a line. In the illustrated embodiment, the amount of the second lenses 14 is 12. The second lenses 14 are one to one corresponding to the first lenses 13. Every second lens 14 includes a light incident surface 141. The light incident surface 141 is opposite to the first light emitting surface 1311 and the second light emitting surface 1321. The second lenses 14 are configured to make the light emitting from the light emitter 202 a parallel light.

The third lenses 15 are defined on the fourth surface 1161 and near to the eighth side surface 1162. In the illustrated embodiment, the amount of the third lenses 15 is four. The third lenses 15 are set in a line which is parallel to the line made of the second lenses 14.

The third lenses 15 are opposite to the second total reflecting surface 123. Every third lens 15 includes a third light emitting surface 151. The third light emitting surface 151 is oriented along a same direction along the light incident surface 141. The third lenses 15 are configured to focus the parallel light reflected by the second total reflecting surface 123 and then transmit the focused beam of light to the photoelectric convertor 203.

FIG. 2 illustrates the PCB 201 includes an installing surface 2011. The light emitter 202, the photoelectric convertor 203, the driver chip 204 and the transimpedance amplifier 205 are all fit on the installing surface 2011 and electrically connected to the PCB 201.

The light emitter 202 is configured to emit light signal. The light emitter 202 can be a laser diode and a light emitting diode. The light emitter 202 is coupled to the corresponding optical fiber 40 by the optical coupling lens 10 so as to realize the transmission of the light signal.

The photoelectric convertor 203 is configured to receive the light signal and convert the light signal to corresponding electric signal. In the illustrated embodiment, the photoelectric convertor 203 is a photo diode. The photoelectric convertor 203 is coupled to the corresponding optical fiber 40 by the optical coupling lens 10.

In the illustrated embodiment, the amount of the light emitters 202 is twelve. The amount of the photoelectric converters 203 is four. The light emitter 202 is corresponding to the second lens 14. The photoelectric convertor 203 is corresponding to the third lens 15. In the at least one embodiment, the amount of the light emitters 202 and the photoelectric convertor 203 is not limited to the amount mentioned above.

The driver chip 204 is configured to control the light emitter 202 to emit light signal. The driver chip 204 is electrically connected to the light emitter 202.

The transimpedance amplifier 205 is configured to convert charges produced by the photoelectric convertor 203 to voltage signal. The transimpedance amplifier 205 is electrically connected to the photoelectric convertor 203.

The filter 301 is configured to filter electric signal and is electrically connected to the photoelectric convertor 203.

The oscilloscope 302 is configured to receive the electric signal output by the filter 301 and then form an eye diagram. The oscilloscope 302 is electrically connected to the filter 301.

Figure 5:
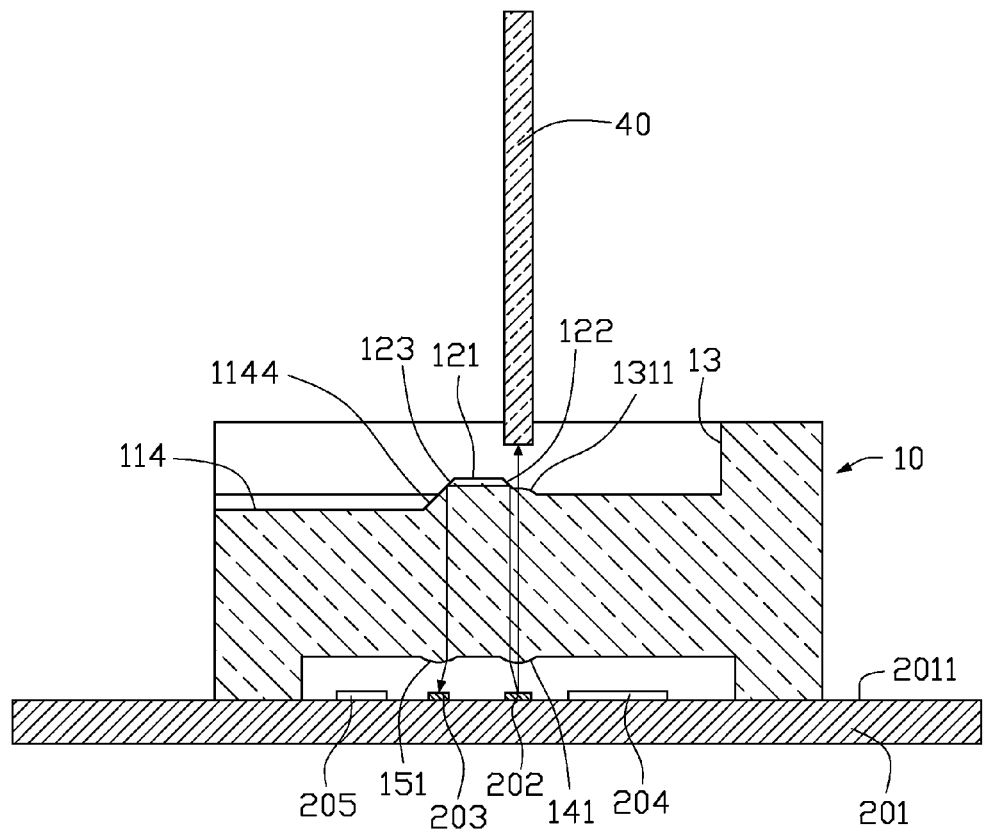
FIG. 5 is a cross sectional view taken along V-V line of FIG. 1.

FIG. 5 illustrates that the light signal emitted by the light emitter 202 passes through the second lens 14 and becomes parallel light, and then the parallel light is transferred to the first lens 13 and the beam splitting section 12. The light in the first lens 13 is a focused beam of light and then transmitted to the optical fiber 40. The light in the beam splitting section 12 refracts 180° after being reflected by the first total reflecting surface 122 and the second total reflecting surface 123, and then passes through the third lens 15 and is received by the photoelectric convertor 203. The photoelectric convertor 203 converts the light signal to a charge signal, the transimpedance amplifier 205 converts the charge signal to the voltage signal, the filter 301 filters the voltage signal and selects a voltage signal in the transmission bands. The voltage signal in the transmission bands will be transmitted to the oscilloscope 302. The oscilloscope 302 will form an eye diagram. By analyzing the eye diagram, people who are viewing the monitor can monitor the energy changes of the optical fiber connector 100 and increase the voltage in time.

It will be understood that the above particular embodiments are shown and described by way of illustration only. The principles and the features of the present disclosure can be employed in various and numerous embodiments thereof without departing from the scope of the disclosure. The above-described embodiments illustrate the scope of the disclosure but do not restrict the scope of the disclosure.

What is claimed is:

1. An optical coupling lens comprising:
a main section comprising a first surface and a second surface opposite to the first surface, a first groove being recessed from the first surface to the second surface; the first groove comprising a third surface; a second groove being recessed from the second surface to the first surface, the second groove comprising a fourth surface;
a beam splitting section comprising a first total reflecting surface and a second total reflecting surface opposite to the first total reflecting surface, a dihedral-angle defined between the first total reflecting surface and the second total reflecting surface;
at least one first lens formed on the third surface and comprising a beam splitter, the beam splitter comprising a first light emitting surface connected to the first total reflecting surface;
at least one second lens formed on the fourth surface and comprising a light incident surface, the at least one second lens being collinear with the at least one first lens one to one; and
at least one third lens formed on the fourth surface and comprising a third light emitting surface, the at least one third lens being collinear with the second total reflecting surface.

2. The optical coupling lens of claim 1, wherein the first groove further comprises a second side surface perpendicular to the first surface, and the beam splitting section is adjacent to the second side surface.

3. The optical coupling lens of claim 1, wherein a dihedral angle between the first total reflecting surface and the third surface is 45°, and the dihedral angle between the first total reflecting surface and the second total reflecting surface is 90°.

4. The optical coupling lens of claim 1, wherein the first groove further comprises a third groove, the third groove comprises a side surface, a dihedral angle is defined by the first surface and the side surface of the third groove, the dihedral angle defined by the first surface and the side surface of the third groove being 45°, and the side surface is coplanar with the second total reflecting surface.

5. The optical coupling lens of claim 1, wherein the first lens further comprises a convergent lens, the convergent lens comprises a second light emitting surface, and light from the second lens corresponding to the convergent lens will emit from the second light emitting surface.

6. The optical coupling lens of claim 1, wherein the first light emitting surface is an asymmetric surface, and the first light emitting surface is a part of an optical surface of a complete symmetrical lens.

7. An optical coupling lens comprising:
a main section comprising:
a first surface;
a second surface opposite the first surface;
the main section forming a first groove extending from the first surface to the second surface and having a third surface formed therein;
the main section forming a second groove extending from the second surface to the first surface and having a fourth surface formed therein;
a beam splitting section comprising a first total reflecting surface and a second total reflecting surface opposite to the first total reflecting surface, wherein a predetermined dihedral-angle is formed between the first total reflecting surface and the second total reflecting surface;
at least one first lens formed on the third surface and comprising a beam splitter, wherein the beam splitter comprises a first light emitting surface connected to the first total reflecting surface;
at least one second lens formed on the fourth surface and comprising a light incident surface, wherein the at least one second lens is collinear with the at least one first lens one to one; and
at least one third lens formed on the fourth surface and comprising a third light emitting surface, wherein the at least one third lens is optically aligned with the second total reflecting surface.

8. The optical coupling lens of claim 7, wherein the first groove further comprises a second side surface perpendicular to the first surface, and the beam splitting section is adjacent to the second side surface.

9. The optical coupling lens of claim 7, wherein a dihedral angle between the first total reflecting surface and the third surface is 45°, and the dihedral angle between the first total reflecting surface and the second total reflecting surface is 90°.

10. The optical coupling lens of claim 7, wherein the first groove further comprises a third groove, the third groove comprises a side surface, a dihedral angle is defined by the first surface and the side surface of the third groove, the dihedral angle defined by the first surface and the side surface of the third groove being 45°, and the side surface is coplanar with the second total reflecting surface.

11. The optical coupling lens of claim 7, wherein the first light emitting surface is an asymmetric surface, and the first light emitting surface is a part of an optical surface of a complete symmetrical lens.

* * * * *